United States Patent
Yazaki et al.

(10) Patent No.: US 9,528,018 B2
(45) Date of Patent: Dec. 27, 2016

(54) ACTIVE RAY-CURABLE INKJET INK, AND IMAGE FORMATION METHOD USING SAME

(71) Applicant: Konica Minolta, Inc., Tokyo (JP)

(72) Inventors: Yuka Yazaki, Kanagawa (JP); Takashi Iwata, Saitama (JP); Satoshi Masumi, Kanagawa (JP); Akio Maeda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/895,803

(22) PCT Filed: Jun. 9, 2014

(86) PCT No.: PCT/JP2014/003065
§ 371 (c)(1),
(2) Date: Dec. 3, 2015

(87) PCT Pub. No.: WO2014/196213
PCT Pub. Date: Dec. 11, 2014

(65) Prior Publication Data
US 2016/0115331 A1   Apr. 28, 2016

(30) Foreign Application Priority Data
Jun. 7, 2013 (JP) ................. 2013-120787

(51) Int. Cl.
*C09D 11/101* (2014.01)
*C09D 11/30* (2014.01)
(Continued)

(52) U.S. Cl.
CPC .............. *C09D 11/38* (2013.01); *B41J 11/002* (2013.01); *B41M 5/0023* (2013.01);
(Continued)

(58) Field of Classification Search
CPC ............................ C09D 11/101; C09D 11/30
See application file for complete search history.

(56) References Cited

U.S. PATENT DOCUMENTS

| 2007/0058020 A1 | 3/2007 | Wetjens et al. |
| 2009/0246403 A1 | 10/2009 | Wetjens et al. |

(Continued)

FOREIGN PATENT DOCUMENTS

| JP | 2007063553 A | 3/2007 |
| JP | 2010132901 A | 6/2010 |

(Continued)

OTHER PUBLICATIONS

International Search Report dated Sep. 16, 2014 for PCT/JP2014/003065 and English translation.

*Primary Examiner* — Veronica F Faison
(74) *Attorney, Agent, or Firm* — Lucas & Mercanti, LLP

(57) ABSTRACT

The purpose of the present invention is to provide: an active ray-curable inkjet ink which has good dispersion stability during storage, good surface smoothness when ejected on a recording medium, and does not undergo the bleeding of a fatty acid onto the surface of the ink; and an image formation method using the active ray-curable inkjet ink. The purpose can be achieved by an active ray-curable inkjet ink which contains: a photopolymerizable compound; at least one wax in the total mass of 1 to 8 mass % relative to the whole mass of the ink; and a fatty acid in the total mass of 0.0001 to 0.10 mass % relative to the whole mass of the wax.

5 Claims, 2 Drawing Sheets

(51) Int. Cl.
*C09D 11/38* (2014.01)
*B41J 11/00* (2006.01)
*B41M 5/00* (2006.01)
*C09D 11/12* (2006.01)

(52) U.S. Cl.
CPC ............ *C09D 11/101* (2013.01); *C09D 11/12* (2013.01); *B41J 2202/21* (2013.01)

(56) References Cited

U.S. PATENT DOCUMENTS

2010/0122642 A1 5/2010 Farrugia et al.
2013/0038668 A1 2/2013 Kaga et al.
2013/0141505 A1 6/2013 Ikeda et al.

FOREIGN PATENT DOCUMENTS

| WO | 2010125854 A1 | 11/2010 |
| WO | 2011136009 A1 | 11/2011 |
| WO | 2012023368 A1 | 2/2012 |
| WO | 2013046699 A1 | 4/2013 |

ACTIVE RAY-CURABLE INKJET INK, AND IMAGE FORMATION METHOD USING SAME

CROSS REFERENCE TO RELATED APPLICATION

This Application is a 371 of PCT/JP2014/003065 filed on Jun. 9, 2014 which, in turn, claimed the priority of Japanese Patent Application No. JP2013-120787 filed Jun. 7, 2013, both applications are incorporated herein by reference.

TECHNICAL FIELD

The present invention relates to an actinic radiation-curable inkjet ink, and an image forming method using the same.

BACKGROUND ART

Inkjet recording methods enable simple and inexpensive image production, and therefore have been used in a variety of printing fields. Among the inkjet recording methods, UV-curable inkjet methods are known in which droplets of UV-curable ink are landed on a recording medium and then cured by irradiation with ultraviolet rays to form an image. Recently, the UV-curable inkjet methods have been attracting attention for their capability of forming images having high rubfastness and adhesion even on recording media which lack ink absorbing properties.

In addition, as for the UV-curable inkjet method, the possibility of high-speed recording, for example, the possibility of high-speed recording by means of a single pass recording method or a high-speed serial method with fewer passes has been studied. However, performing high-speed recording involves such a problem that the interval between neighboring ink drops (dots) becomes smaller, and thus the neighboring dots are likely to combine with each other, which makes the image quality likely to be lowered. In order to prevent such combining of neighboring dots, the enhancement of pinning properties of a UV-curable inkjet ink has been studied.

As a method of enhancing the pinning properties of a UV-curable inkjet ink, it has been studied, for example, to add a gelling agent (hereinafter, also referred to as "wax") to the ink to allow the ink to undergo sol-gel phase transition depending on temperature. That is, methods have been studied in which ink droplets are discharged in a liquid state at high temperature, and are landed on a recording medium. Concurrently with the landing, the ink droplets are cooled to be gelled, thereby preventing the combining of dots (see, e.g., PTLs 1 and 2).

CITATION LIST

Patent Literature

PTL 1
U.S. Patent Application Publication No. 2007/0058020
PTL 2
Japanese Patent Application Laid-Open No. 2007-63553

SUMMARY OF INVENTION

Technical Problem

A method has been proposed in which, for example, a fatty acid ester is added as a wax. However, when a fatty acid ester is added, a fatty acid inevitably enters ink, thus sometimes causing the fatty acid to bleed on the surface of the ink after the solidification of the ink. The bleeding is presumed to be caused by the fact that a fatty acid is likely to move to the surface of an ink droplet, since the molecular chain of the fatty acid is shorter than that of the fatty acid ester. Therefore, it has been required to reduce the concentration of the fatty acid in the ink.

On the other hand, when the concentration of the fatty acid in the ink is reduced too much, the surface slipperiness of a recording medium is lowered after the ink is discharged onto the recording medium and cured, thus causing so-called paper jam to easily occur. Further, when the concentration of the fatty acid in the ink is increased in order to enhance the surface slipperiness, the dispersion stability of the ink is lowered, thus causing density unevenness to easily occur and ejection stability to be easily lowered.

In view of the above, an object of the present invention is to provide an actinic radiation-curable inkjet ink having satisfactory dispersion stability of the ink during storage as well as satisfactory surface slipperiness of the ink when being discharged onto a recording medium without the occurrence of bleeding of a fatty acid on the surface of the ink, and an image forming method using the same.

Solution to Problem

1. An actinic radiation-curable inkjet ink containing an actinic radiation-curable compound, at least one wax having a total mass of 1 to 8 wt % to a total mass of the ink, and a fatty acid having a total mass of 0.0001 to 0.10 wt % to the total mass of the wax.
2. The actinic radiation-curable inkjet ink according to 1, in which the total mass of the wax to the total mass of the ink is 1 to 4 wt %.
3. The actinic radiation-curable inkjet ink according to 1 or 2, in which the wax is at least one of compounds represented by General Formulas (G1) and (G2):

R1-CO—R2           General Formula (G1):

R3-COO—R4         General Formula (G2):

where R1 to R4 each independently represent an alkyl chain which has a straight chain moiety having 12 or more carbon atoms and which may have a branch.
4. The actinic radiation-curable inkjet ink according to any one of 1 to 3, in which the fatty acid is a compound having 12 or more carbon atoms.
5. An image forming method using the actinic radiation-curable inkjet ink according to any one of 1 to 4, in which a temperature of a recording medium at a time when the actinic radiation-curable inkjet ink is landed on the recording medium is set within a range 20° C. to 7° C. lower than a sol-gel phase transition temperature of the actinic radiation-curable inkjet ink.

Advantageous Effects of Invention

According to the present invention, it is possible to provide the actinic radiation-curable inkjet ink having satisfactory dispersion stability of the ink during storage as well as satisfactory surface slipperiness of the ink when being discharged onto a recording medium without the occurrence of bleeding of a fatty acid on the surface of ink, and an image forming method using the same.

DESCRIPTION OF EMBODIMENTS

Figure 1A:
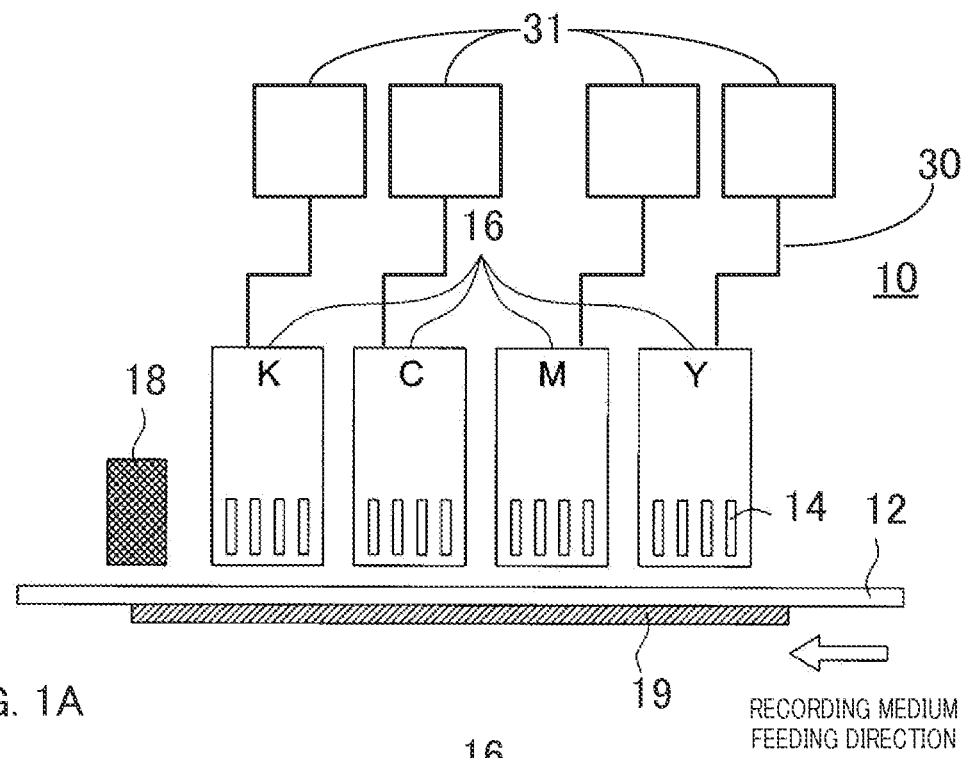
FIG. 1A is a side view illustrating an example of a configuration of a main part of a line recording type inkjet recording apparatus.

Hereinafter, the present invention will be described with reference to an embodiment, but the present invention is not intended to be limited to the following embodiment. The present inventors have found that the use of a predetermined wax enables the enhancement of the surface slipperiness of ink when being discharged onto a recording medium, while enabling the problem of bleeding to be overcome. The present invention is based on the above-mentioned findings. That is, the actinic radiation-curable inkjet ink according to the embodiment contains an actinic radiation-curable compound, at least one wax having a total mass of 1 to 8 wt % to a total mass of the ink, and a fatty acid having a total mass of 0.0001 to 0.10 wt % to the total mass of the wax. Hereinafter, the ink according to the embodiment will be described in detail by way of explanation of each component.

[Actinic Radiation-Curable Compound]

The actinic radiation-curable compound is a photocurable compound which undergoes crosslinking or polymerization with actinic radiation. Examples of the actinic radiation include electron beams, ultraviolet rays, α rays, γ rays, and X rays, among which ultraviolet rays and electron beams are preferred. The actinic radiation-curable compound may be a radical polymerizable compound or a cationic polymerizable compound, among which a radical polymerizable compound is preferred.

The radical polymerizable compound is a compound (monomer, oligomer, polymer or mixture thereof) which has a radically polymerizable ethylenically unsaturated bond. The radical polymerizable compounds may be contained in the actinic radiation-curable inkjet ink either singly or in combination.

Examples of the compound having a radically polymerizable ethylenically unsaturated bond include unsaturated carboxylic acids and salts thereof, unsaturated carboxylic ester compounds, unsaturated carboxylic urethane compounds, unsaturated carboxylic amide compounds and anhydrides thereof, acrylonitrile, styrene, unsaturated polyesters, unsaturated polyethers, unsaturated polyamides, and unsaturated urethanes. Examples of the unsaturated carboxylic acid include (meth)acrylic acid, itaconic acid, crotonic acid, isocrotonic acid, and maleic acid.

Among the foregoing, the radical polymerizable compound is preferably an unsaturated carboxylic ester compound, and more preferably a (meth)acrylate compound. In addition to the monomer to be described hereinafter, the (meth)acrylate compound may be an oligomer, a mixture of a monomer and an oligomer, a modified product, or an oligomer having a polymerizable functional group.

Examples of the (meth)acrylate compound include monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxy ethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxy ethyl succinate, 2-(meth)acryloyloxy ethyl phthalate, 2-(meth)acryloyloxyethyl-2-hydroxyethyl-phthalate, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, di(meth)acrylate of a PO adduct of bisphenol A, hydroxy pivalic acid neopentyl glycol di(meth)acrylate, and polytetramethylene glycol di(meth)acrylate; and trifunctional or higher functional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate.

Preferred examples of the (meth)acrylate compound include stearyl (meth)acrylate, lauryl (meth)acrylate, isostearyl (meth)acrylate, ethoxy diethylene glycol (meth)acrylate, isobornyl (meth)acrylate, tetraethylene glycol di(meth)acrylate, and glycerin propoxy tri(meth)acrylate, from the viewpoints of photosensitivity, and the like.

The (meth)acrylate compound may be a modified product. Examples of the modified product include ethylene oxide modified (meth)acrylate compounds such as ethylene oxide modified trimethylolpropane tri(meth)acrylate, and ethylene oxide modified pentaerythritol tetraacrylate; caprolactone modified (meth)acrylate compounds such as caprolactone modified trimethylolpropane tri(meth)acrylate; and caprolactam modified (meth)acrylate compounds such as caprolactam modified dipentaerythritol hexa(meth)acrylate. As used herein, the "(meth)acrylate" also includes an acrylate monomer and/or an acrylate oligomer, and a methacrylate monomer and/or a methacrylate oligomer.

The actinic radiation-curable inkjet ink is a sol-gel phase transition type inkjet ink, and therefore at least some of the actinic radiation-curable compounds are preferably ethylene oxide modified (meth)acrylate compounds. This is because the ethylene oxide modified (meth)acrylate compound has high photosensitivity, and is likely to form a card house structure (to be described hereinafter) when the ink is gelled at low temperature. Further, the ethylene oxide modified (meth)acrylate compound is likely to be dissolved in other ink components at high temperature and also shows less shrinkage on curing, thus making a printed material less likely to be curled.

Examples of the ethylene oxide modified (meth)acrylate compound include 4EO modified hexanediol diacrylate CD561 (molecular weight: 358), 3EO modified trimethylolpropane triacrylate SR454 (molecular weight: 429), 6EO modified trimethylolpropane triacrylate SR499 (molecular weight: 560), and 4EO modified pentaerythritol tetraacrylate SR494 (molecular weight: 528) all manufactured by Sartomer Company; polyethylene glycol diacrylate NK ester A-400 (molecular weight: 508), polyethylene glycol diacrylate NK ester A-600 (molecular weight: 742), polyethylene glycol dimethacrylate NK ester 9G (molecular weight: 536), and polyethylene glycol dimethacrylate NK ester 14G (molecular weight: 770) all manufactured by Shin-Nakamura Chemical Co., Ltd.; tetraethylene glycol diacrylate V#335HP (molecular weight: 302) manufactured by Osaka Organic Chemical Industry Ltd.; 3PO modified trimethylolpropane triacrylate Photomer 4072 (molecular weight: 471, C log P 4.90) manufactured by Cognis Corporation; and 1,10-decanediol dimethacrylate NK ester DOD-N (molecular weight: 310, C log P 5.75), tricyclodecanedimethanol diacrylate NK ester A-DCP (molecular weight: 304, C log P 4.69), and tricyclodecanedimethanol dimethacrylate NK ester DCP (molecular weight: 332, C log P 5.12) all manufactured by Shin-Nakamura Chemical Co., Ltd.

Here, the "log P value" is a coefficient indicating the affinity of an organic compound for water and 1-octanol. The 1-octanol/water partition coefficient P is a partition equilibrium obtained when a trace amount of a compound is dissolved as a solute in a two-liquid phase solvent of 1-octanol and water, and the partition coefficient P is the ratio of equilibrium concentrations of the compound in the respective solvents and is expressed as log P, the logarithm to the base 10 of the partition coefficient. That is, the "log P value" is a logarithmic value of the partition coefficient of 1-octanol/water, and is known as an important parameter indicating the hydrophilicity and hydrophobicity of a molecule.

"C log P value" is a log P value found by calculation. The C log P value can be calculated by the fragment method, atomic approach method, or the like. More specifically, in order to calculate the C log P value, the fragment method described in the literature (C. Hansch and A. Leo, "Substituent Constants for Correlation Analysis in Chemistry and Biology" (John Wiley & Sons, New York, 1969)), or commercially available software package 1 or 2 described below may be used.

Software package 1: MedChem Software (Release 3.54, August 1991, Medicinal Chemistry Project, Pomona College, Claremont, Calif.)

Software package 2: ChemDraw Ultra Ver. 8.0. (April 2003, CambridgeSoft Corporation, USA)

The numerical value of the C log P value as used herein is a "C log P value" calculated using software package 2.

The (meth)acrylate compound may be a polymerizable oligomer. Examples of the polymerizable oligomer include epoxy (meth)acrylate oligomers, aliphatic urethane (meth)acrylate oligomers, aromatic urethane (meth)acrylate oligomers, polyester (meth)acrylate oligomers, and straight-chain (meth)acrylic oligomers.

The cationic polymerizable compound may be an epoxy compound, a vinyl ether compound, or an oxetane compound. The cationic polymerizable compounds may be contained in the actinic radiation-curable inkjet ink either singly or in combination.

The epoxy compound is, for example, an aromatic epoxide, an alicyclic epoxide, or an aliphatic epoxide. Aromatic epoxides and alicyclic epoxides are preferred in view of enhancing curability.

The aromatic epoxide may be di- or polyglycidyl ether, which is obtained by reacting polyhydric phenol or an alkylene oxide adduct thereof with epichlorohydrin. Examples of the polyhydric phenol or the alkylene oxide adduct thereof to be reacted include bisphenol A and alkylene oxide adducts thereof. The alkylene oxide in the alkylene oxide adduct may be, for example, ethylene oxide or propylene oxide.

The alicyclic epoxide may be a cycloalkane oxide-containing compound, which is obtained by epoxidizing a cycloalkane-containing compound with an oxidizing agent such as hydrogen peroxide or peracid. The cycloalkane in the cycloalkane oxide-containing compound may be cyclohexene or cyclopentene.

The aliphatic epoxide may be di- or polyglycidyl ether, which is obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct may be, for example, ethylene oxide or propylene oxide.

Examples of the vinyl ether compound include monovinyl ether compounds such as ethylvinyl ether, n-butylvinyl ether, isobutylvinyl ether, octadecylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, diethylene glycol monovinyl ether, and octadecylvinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Among these vinyl ether compounds, di- or trivinyl ether compounds are preferred in light of curability and adhesion.

The oxetane compound is a compound having an oxetane ring. Examples thereof include oxetane compounds described in Japanese Patent Application Laid-Open Nos. 2001-220526, 2001-310937, and 2005-255821. Specific examples thereof, among those, include a compound represented by General Formula (1) described in paragraph [0089] of Japanese Patent Application Laid-Open No. 2005-255821, a compound represented by General Formula (2) described in paragraph [0092] thereof, a compound represented by General Formula (7) described in paragraph [0107] thereof, a compound represented by General Formula (8) described in paragraph [0109] thereof, and a compound represented by General Formula (9) described in paragraph [0116] thereof. General Formulas (1), (2), (7), (8), and (9) described in Japanese Patent Application Laid-Open No. 2005-255821 are shown below.

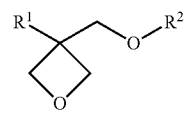

General Formula (1)

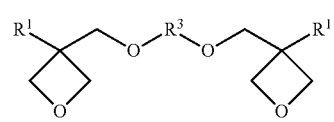

General Formula (2)

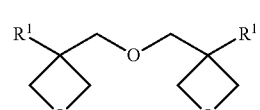

General Formula (7)

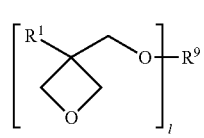

General Formula (8)

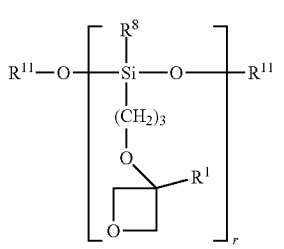

General Formula (9)

The content of the actinic radiation-curable compound in the actinic radiation-curable inkjet ink is preferably 1 to 97 wt %, and more preferably 30 to 95 wt %.

[Wax]

"Wax" is generally defined as an organic substance which is a solid at normal temperature, and becomes a liquid on heating. The melting point of the wax is preferably 30° C. or higher and lower than 150° C. The wax contained in the actinic radiation-curable inkjet ink preferably has at least the features of 1) being dissolved in the actinic radiation-curable compound at a temperature higher than a gelation temperature, and 2) being crystallized in the ink at a temperature not higher than the gelation temperature. It is noted that the wax in the present invention does not include a fatty acid.

In the above-mentioned feature 1), the "sol-gel phase transition temperature" means a temperature of change (transition) point at which a change (transition) from sol state to gel state occurs, and it has the same meaning as the terms such as gel transition temperature, gel dissolution temperature, gel softening temperature, sol-gel transition point, and gelling point.

In the above-mentioned feature 2), when the wax is crystallized in the ink, it is preferable that a space three-dimensionally surrounded by plate-like crystals, a crystallization product of the wax, be formed so that the actinic radiation-curable compound is contained in that space. A structure in which the actinic radiation-curable compound is contained in the space three-dimensionally surrounded by the plate-like crystals, as described above, is sometimes referred to as "card house structure." Once a card house structure is formed, the liquid actinic radiation-curable compound can be retained, and ink droplets can be pinned. Thus, combining of droplets can be prevented. It is preferable that the actinic radiation-curable compound and the wax dissolved in the ink be compatible each other, in order to form the card house structure. In contrast, when the phases of the actinic radiation-curable compound and the wax dissolved in the ink are separated from each other, the card house structure sometimes may be difficult to form.

The type of the wax is not particularly limited. Preferred examples of the wax include:

aliphatic ketones such as dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone (e.g., 18-Pentatriacontanon (manufactured by AlfaAeser), Hentriacontan-16-on (manufactured by AlfaAeser), and Kao Wax T1 (manufactured by Kao Corporation));

aliphatic esters such as behenyl behenate, icosyl icosanoate, stearyl stearate, palmityl stearate, cetyl palmitate, myristyl myristate, cetyl myristate, and myricyl cerotate (e.g., UNISTAR-M-2222SL (manufactured by NOF Corporation), EXCEPARL SS (manufactured by Kao Corporation, melting point: 60° C.), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.));

petroleum waxes such as paraffin wax, microcrystalline wax, and petrolatum; plant-derived waxes such as candelilla wax, carnauba wax, rice wax, sumac wax, jojoba oil, solid jojoba wax, and jojoba ester;

animal-derived waxes such as beeswax, lanolin, and spermaceti;

mineral waxes such as montan wax and hydrogenated wax;

hydrogenated castor oil and hydrogenated castor oil derivatives;

modified waxes such as montan wax derivatives, paraffin wax derivatives, microcrystalline wax derivatives, and polyethylene wax derivatives;

higher alcohols such as stearyl alcohol and behenyl alcohol;

hydroxystearic acids such as 12-hydroxystearic acid;

12-hydroxystearic acid derivatives;

fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Itoh Oil Chemicals Co., Ltd., FATTY AMID series manufactured by Kao Corporation, and the like);

N-substituted fatty acid amides such as N-stearyl stearic acid amide, and N-oleyl palmitic acid amide;

specialty fatty acid amides such as N,N'-ethylene bis-stearylamide, N,N'-ethylene bis-12-hydroxystearylamide, and N,N'-xylylene bisstearylamide;

higher amines such as dodecylamine, tetradecylamine, and octadecylamine;

fatty acid ester compounds such as stearyl stearic acid ester, oleyl palmitic acid ester, glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., POEM series manufactured by Riken Vitamin Co., Ltd., and the like);

sucrose fatty acid esters such as sucrose stearic acid ester and sucrose palmitic acid ester (e.g., RYOTO Sugar Ester series manufactured by Mitsubishi-Kagaku Foods Corporation);

synthetic waxes such as polyethylene wax and α-olefin-malic anhydride copolymer wax (UNILIN series manufactured by Baker-Petrolite Corporation, and the like); and dimer diols (PRIPOR series manufactured by CRODA International Plc, and the like). The waxes may be contained in the actinic radiation-curable inkjet ink either singly or in combination.

As the wax, in particular, aliphatic ketones, fatty acid esters, higher alcohols, and fatty acid amides are preferred, with aliphatic ketones and fatty acid esters being more preferred.

Examples of the particularly preferred wax include compounds represented by the following General Formulas (G1) and (G2):

R1-CO—R2    General Formula (G1):

R3-COO—R4    General Formula (G2):

wherein R1 to R4 each independently represent an alkyl chain which has a straight chain moiety having 12 or more carbon atoms and which may have a branch.

General Formula (G1) represents an aliphatic ketone, and General Formula (G2) represents a fatty acid ester. These waxes are preferred, since they enable ink droplets to be stably (reproducibly) gelled and can prevent the combining of ink droplets (dots) landed on a recording medium.

The sol-gel transition temperature of the inkjet ink is set arbitrarily, and is preferably within a range from 30 to 100° C., from the viewpoints of stable ejection of the ink droplets, adverse effects that accompany heating at high temperature, and the like. Further, the sol-gel transition temperature is preferably set between the temperature of the ink inside an inkjet recording head and the temperature of a recording medium.

Regarding the method of measuring the sol-gel transition temperature, for example, a gel-like specimen is placed on a heating plate, followed by heating the heating plate, and a temperature at which the specimen is deformed is measured, which temperature can be determined as the sol-gel phase transition temperature. Further, it is also possible to use a commercially available viscoelasticity meter (e.g., viscoelasticity meter MCR300 manufactured by Physica Messtechnik GmbH) to measure the sol-gel phase transition temperature.

The sol-gel transition temperature can be adjusted according to, for example, the type, amount of addition, and the like of the photocurable compound to be described hereinafter.

Since the ink according to the embodiment contains a predetermined amount of a wax (gelling agent), when the ink is discharged from an inkjet recording head, landed as ink droplets on a recording medium, and cooled to a temperature lower than the sol-gel phase transition temperature, the ink quickly turns into a gel state. Accordingly, mixing or combining of dots is prevented, and a high quality image can be formed in high-speed printing. Thereafter, the ink is fixed onto the recording medium as the gelled ink droplets are cured by irradiation with light, and a firm image film is formed.

Since the ink according to the embodiment does not allow ink droplets to spread on a recording medium as the ink droplets landed on the recording medium quickly undergo gelation, it is less likely that oxygen in the environment enters the ink droplets. Thus, curing is less likely to be influenced by oxygen inhibition.

The wax content in the actinic radiation-curable inkjet ink is preferably 1 to 8 wt %, and more preferably 1 to 4 wt % to the total mass of the ink. When two or more types of waxes are contained, the total amount of the waxes is preferably in the above-mentioned range. When the wax content is less than 1 wt %, it is possible that the actinic radiation-curable inkjet ink may not undergo sol-gel phase transition sufficiently. On the other hand, when the wax content exceeds 10 wt %, the ejection properties of the ink from the inkjet head may sometimes be lowered.

(Method of Reducing Amount of Fatty Acid in Wax)

Examples of a method of reducing the amount of a fatty acid in the wax include adding to the wax an alcohol that constitutes the wax. As a specific mode, a method of reducing the amount of a fatty acid in a fatty acid ester will be described below. For example, when R3-COO—R4 of the General Formula (G2) is set as the fatty acid ester, R3-COOH is set as the fatty acid, and R4-OH is set as the alcohol, the alcohol (R4-OH), concentrated sulfuric acid, and a solvent (octadecene) are added to the fatty acid ester containing the fatty acid (R3-COO—R4/R3-COOH) to give a mixture. The resultant mixture is loaded into a Dean-Stark apparatus. Thereafter, the mixture is heated and stirred to draw water generated by the reaction in the system. Next, the mixture is cooled to an arbitrary temperature, and crystals in the ester are extracted. Recrystallization is repeated further in a mixed solution of hexane and methanol to remove 1-octadecene contained in the crystal. In the manner as described above, the amount of a fatty acid in a fatty acid ester can be reduced. It is noted that the amount of a fatty acid in an aliphatic ketone can also be reduced by a similar method. Furthermore, it is also possible to synthesize a target wax only from raw materials, unlike obtaining the target wax by the method of reducing the amount of the fatty acid in the wax. At that time, a target fatty acid ester is obtained by blending a less amount of the fatty acid than that of alcohol.

[Fatty Acid]

The ink according to the embodiment preferably contains 0.0001 to 0.10 wt % of a fatty acid to the total amount of the wax. Further, the ink according to the embodiment preferably contains 0.01 to 10 ppm by mass of a fatty acid to the total amount of the ink. The fatty acid is preferably a compound having 12 or more carbon atoms. Specific examples of the fatty acid include behenic acid ($C_{22}H_{44}O_2$), arachidic acid ($C_{20}H_{40}O_2$), stearic acid ($C_{18}H_{36}O_2$), palmitic acid ($C_{16}H_{32}O_2$), myristic acid ($C_{14}H_{28}O_2$), lauric acid ($C_{12}H_{24}O_2$), oleic acid ($C_{18}H_{34}O_2$), and erucic acid ($C_{22}H_{42}O_2$), such as LUNAC BA, LUNAC S-90V, LUNAC S-98, LUNAC P-70, LUNAC P-95, LUNAC MY-98, LUNAC L-70, and LUNAC L-98 (all manufactured by Kao Corporation); and NAA-222S beads, NAA-222 powders, beads stearic acid Sakura, beads stearic acid Tsubaki, powder stearic acid Sakura, powder stearic acid Tsubaki, NAA-160, NAA-142, NAA-122, NAA-34, NAA-35, and erucic acid (all manufactured by NOF Corporation).

When the total mass of the fatty acid to the total mass of the wax is less than 0.0001 wt %, the surface slipperiness of the ink is deteriorated when the ink is discharged onto a recording medium, thus causing so-called paper jam to easily occur. On the other hand, when the total mass of the fatty acid to the total mass of the wax exceeds 0.10 wt %, the dispersion stability of the ink is lowered, and bleeding may undesirably occur on the recording medium.

(Detection of Amount of Fatty Acid)

The amount of the fatty acid contained in the ink can be measured, for example, by high-speed liquid chromatography (HPLC) or gas chromatography (GC). It is noted that the detection method is one example, and the method of detecting the fatty acid is not limited to HPLC or GC in the present invention. Hereinafter, typical detection conditions for HPLC and GC are described.

Measurement Conditions for HPLC

Apparatus: HP1100 series HPLC

Column: Inertsil ODS-3 (4.6 mm id, 150 mm, 5 μm), 40° C.

Eluent A/B: 0.1 M ammonium acetate buffer solution pH 5.0/methanol

Gradient B: 90% to 100% (15 to 30 min)

Flow rate: 0.8 ml/min

Injection amount: 10 μl

Detection: ESI-MS or ELSD

Measurement Conditions for GC

It is noted that, at that time, measurement is performed after the fatty acid undergoes methyl esterification with boron trifluoride.

Apparatus: Agilent 6890GC

Column: DB-Wax 30 m×0.25 mm i.d., 0.25 μm

Oven temperature: 50° C. (1 min)—25° C./min—200° C.—3° C./min—230° C. (18 min)

Injection port temperature: 250° C.

Injection amount: 1 μL

Split ratio: 1/50

Carrier gas: helium

Detector: FID or Agilent 5973 MSD

[Photopolymerization Initiator]

The actinic radiation-curable inkjet ink may further contain a photopolymerization initiator. Specifically, when actinic radiation is electron beams, typically the photopolymerization initiator does not need to be contained, whereas when the actinic radiation is ultraviolet rays, the photopolymerization initiator is preferably contained.

The photopolymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen withdrawing type photopolymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyl-diphenyl sulfide, acrylated benzophenone, 3,3',4,4'-tetra-(t-butyl peroxy carbonyl) benzophenone, and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

The photopolymerization initiator content in the actinic radiation-curable inkjet ink is preferably 0.01 to 10 wt %, although it depends on the type of active rays, or actinic radiation-curable compounds, or the like.

The actinic radiation-curable inkjet ink may contain a photoacid generating agent as the photopolymerization initiator. Examples of the photoacid generating agent to be used include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

The actinic radiation-curable inkjet ink may further contain a photopolymerization initiator auxiliary agent, a polymerization inhibitor, or the like, as necessary. The photopolymerization initiator auxiliary agent may be a tertiary amine compound, and is preferably an aromatic tertiary amine compound. Examples of the aromatic tertiary amine compound include N,N-dimethylaniline, N,N-diethylaniline, N,N-dimethyl-p-toluidine, ethyl N,N-dimethylamino-p-benzoate, ethyl N,N-dimethylamino-p-benzoic acid isoamylate, N,N-dihydroxy ethylaniline, triethylamine, and N,N-dimethyl hexylamine Among those, ethyl N,N-dimethylamino-p-benzoate and ethyl N,N-dimethylamino-p-benzoic acid isoamylate are preferred. These compounds may be contained in the actinic radiation-curable inkjet ink either singly or in combination.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenyl hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

[Colorant]

The actinic radiation-curable inkjet ink may further contain a colorant, as necessary. Although the colorant may be a dye or a pigment, a pigment is more preferred because it has satisfactory dispersibility in ink constituents and is excellent in weather resistance. The pigment is not particularly limited, and may be, for example, an organic pigment or an inorganic pigment of any of the following numbers described in the color index.

Examples of red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36. Examples of blue or cyan pigment include Pigment Blue 1, 15, 15:1, 15:2, 15:3, 15:4, 15:6, 16, 17-1, 22, 27, 28, 29, 36, and 60. Examples of green pigment include Pigment Green 7, 26, 36, and 50. Examples of yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigment include Pigment Black 7, 28, and 26.

Examples of commercially available products of the pigment include Chromo Fine Yellow 2080, 5900, 5930, AF-1300, and 2700L, Chromo Fine Orange 3700L and 6730, Chromo Fine Scarlet 6750, Chromo Fine Magenta 6880, 6886, 6891N, 6790, and 6887, Chromo Fine Violet RE, Chromo Fine Red 6820 and 6830, Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromo Fine Green 2GN, 2G0, 2G-550D, 5310, 5370, and 6830, Chromo Fine Black A-1103, Seika Fast Yellow 10GH, A-3, 2035, 2054, 2200, 2270, 2300, 2400(B), 2500, 2600, ZAY-260, 2700(B), and 2770, Seika Fast Red 8040, C405(F), CA120, LR-116, 1531B, 8060R, 1547, ZAW-262, 1537B, GY, 4R-4016, 3820, 3891, and ZA-215, Seika Fast Carmine 6B1476T-7, 1483LT, 3840, and 3870, Seika Fast Bordeaux 10B-430, Seika Light Rose R40, Seika Light Violet B800 and 7805, Seika Fast Maroon 460N, Seika Fast Orange 900 and 2900, Seika Light Blue C718 and A612, and Cyanine Blue 4933M, 4933GN-EP, 4940, and 4973 (Dainichiseika Color & Chemicals Mfg. Co., Ltd.);

KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (DIC Corporation);

Colortex Yellow 301, 314, 315, 316, P-624, 314, U10GN, U3GN, UNN, UA-414, and U263, Finecol Yellow T-13 and T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (Sanyo Color Works, LTD.);

Lionol Yellow 1405G, and Lionol Blue FG7330, FG7350, FG7400G, FG7405G, ES, and ESP-S (Toyo Ink Co., Ltd.), Toner Magenta E02, Permanent Rubin F6B, Toner Yellow HG, Permanent Yellow GG-02, and Hostapeam Blue B2G (Hoechst Industry Ltd.);

Novoperm P-HG, Hostaperm Pink E, and Hostaperm Blue B2G (Clariant (Japan) K.K.); and Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (Mitsubishi Chemical Company).

Dispersing of the pigment can be performed by means of ball mill, sand mill, attritor, roll mill, agitator, HENSCHEL MIXER, colloid mill, ultrasonic homogenizer, pearl mill, wet jet mill, or paint shaker, for example. Dispersing of the pigment is preferably performed such that the average particle size of the pigment particles is preferably 0.08 to 0.5 μm, and that the maximum particle size is preferably 0.3 to 10 μm, and more preferably 0.3 to 3 μm. Dispersing of the pigment is controlled by the selection of the pigment, dispersant and dispersion medium, dispersion conditions, filtration conditions, and the like.

In order to enhance the dispersibility of the pigment, the actinic radiation-curable inkjet ink may further contain a dispersant. Examples of the dispersant include hydroxyl group-containing carboxylic acid esters, salts of long chain polyaminoamides and high molecular weight acid esters, salts of high molecular weight polycarboxylic acids, salts of long chain polyaminoamides and polar acid esters, high molecular weight unsaturated acid esters, high molecular weight copolymers, modified polyurethane, modified polyacrylate, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available products of the dispersant include Solsperse series of Avecia Biotechnology, Inc., and PB series of Ajinomoto Fine-Techno Co., Inc.

The actinic radiation-curable inkjet ink may further contain a dispersion promoter, as necessary. The dispersion promoter can be selected according to the pigment.

The total amount of the dispersant and the dispersion promoter is preferably 1 to 50 wt % to the total mass of the pigment.

The actinic radiation-curable inkjet ink may further contain a dispersion medium for dispersing the pigment, as necessary. A solvent may be contained as the dispersion medium in the ink. However, for preventing the solvent from remaining in a formed image, it is preferable that the dispersion medium should be any of the above-described actinic radiation-curable compounds (in particular, low viscous monomers).

The dye may be an oil soluble dye, or the like. Examples of the oil soluble dye include the following various dyes. Examples of magenta dye include MS Magenta VP, MS Magenta HM-1450, and HM Magenta HSo-147 (all manufactured by Mitsui-Toatsu Chemicals), AIZEN SOT Red-1, AIZEN SOT Red-2, AIZEN SOT Red-3, AIZEN SOT Pink-1, and SPIRON Red GEH SPECIAL (all manufactured by Hodogaya Chemical Co., Ltd.), RESOLIN Red FB 200%, MACROLEX Red Violet R, and MACROLEX ROT5B (all manufactured by Bayer Japan), KAYASET Red B, KAYASET Red 130, and KAYASET Red 802 (all manufactured by Nippon Kayaku Co., Ltd.), PHLOXIN, ROSE BENGAL, and ACID Red (all manufactured by Daiwa Kasei), HSR-31, and DIARESIN Red K (all manufactured by Mitsubishi-Kasei), and Oil Red (manufactured by BASF Japan).

Examples of cyan dye include MS Cyan HM-1238, MS Cyan HSo-16, Cyan HSo-144, and MS Cyan VPG (all manufactured by Mitsui-Toatsu Chemicals), AIZEN SOT Blue-4 (manufactured by Hodogaya Chemical Co., Ltd.), RESOLIN BR, Blue BGLN 200%, MACROLEX Blue RR, CERES Blue GN, SIRIUS SUPRA TURQ. Blue Z-BGL, and SIRIUS SUPRA TURQ. Blue FB-LL 330% (all manufactured by Bayer Japan), KAYASET Blue FR, KAYASET Blue N, KAYASET Blue 814, Turq. Blue GL-5 200, and Light Blue BGL-5 200 (all manufactured by Nippon Kayaku Co., Ltd.), DAIWA Blue 7000, and Oleosol Fast Blue GL (all manufactured by Daiwa Kasei), DIARESIN Blue P (manufactured by Mitsubishi-Kasei), and SUDAN Blue 670, NEOPEN Blue 808, and ZAPON Blue 806 (all manufactured by BASF Japan).

Examples of yellow dye include MS Yellow HSm-41, Yellow KX-7, and Yellow EX-27 (Mitsui-Toatsu Chemicals), AIZEN SOT Yellow-1, AIZEN SOT Yellow-3, and AIZEN SOT Yellow-6 (all manufactured by Hodogaya Chemical Co., Ltd.), MACROLEX Yellow 6G, and MACROLEX FLUOR Yellow 10GN (all manufactured by Bayer Japan), KAYASET Yellow SF-G, KAYASET Yellow 2G, KAYASET Yellow A-G, and KAYASET Yellow E-G (all manufactured by Nippon Kayaku Co., Ltd.), DAIWA Yellow 330HB (manufactured by Daiwa Kasei), HSY-68 (manufactured by Mitsubishi-Kasei), and SUDAN Yellow 146, and NEOPEN Yellow 075 (all manufactured by BASF Japan).

Examples of black dye include MS Black VPC (manufactured by Mitsui-Toatsu Chemicals), AIZEN SOT Black-1, and AIZEN SOT Black-5 (all manufactured by Hodogaya Chemical Co., Ltd.), RESORIN Black GSN 200%, and RESOLIN Black BS (all manufactured by Bayer Japan), KAYASET Black A-N (manufactured by Nippon Kayaku Co., Ltd.), DAIWA Black MSC (manufactured by Daiwa Kasei), HSB-202 (manufactured by Mitsubishi-Kasei), and NEPTUNE Black X60, and NEOPEN Black X58 (all manufactured by BASF Japan).

The content of the pigment or dye is preferably 0.1 to 20 wt %, and more preferably 0.4 to 10 wt % relative to the actinic radiation-curable inkjet ink. The reason why the above range is preferable is as follows. When the content of the pigment or dye is excessively small, color exhibition of an image to be obtained is insufficient, whereas when the content is excessively large, the ink viscosity is increased to lower the ejection properties.

(Other Components)

The actinic radiation-curable inkjet ink may further contain other components, as necessary. Other components may be various additives, or other resins. Examples of the additives include surfactants, leveling additives, matting agents, UV absorbers, IR absorbers, antibacterial agents, and basic compounds that serve to increase the storage stability of the ink. Examples of the basic compounds include basic alkali metal compounds, basic alkali earth metal compounds, and basic organic compounds such as amines Examples of other resins include resins for adjusting the physical properties of a cured film; examples thereof include polyester resins, polyurethane resins, vinyl resins, acrylic resins, rubber resins, and waxes.

The actinic radiation-curable inkjet ink can be obtained by mixing the above-mentioned actinic radiation-curable compound, a wax, a liquid component, and an arbitrary component under heating. The obtained liquid mixture is preferably filtered with a predetermined filter.

(Actinic Radiation-Curable Inkjet Ink)

As described above, the actinic radiation-curable inkjet is an ink which undergoes a temperature-induced reversible sol-gel phase transition. Since a sol-gel phase transition type actinic radiation-curable ink is a sol at high temperature (e.g., about 80° C.), the ink can be discharged from an inkjet recording head. Once the actinic radiation-curable inkjet ink is discharged at high temperature, ink drops (dots) are landed on a recording medium, and then undergo gelation by natural cooling. Thus, combining of neighboring dots can be prevented to enhance the image quality.

In order to enhance the ejection properties of the sol-gel phase transition type ink, the viscosity of the ink at high temperature is preferably equal to or lower than a predetermined value. Specifically, the viscosity at 80° C. of the actinic radiation-curable inkjet ink is preferably 3 to 20 mPa·s. On the other hand, in order to prevent the combining of neighboring dots, the ink viscosity at room temperature after landing is preferably equal to or higher than a certain value. Specifically, the viscosity at 25° C. of the actinic radiation-curable inkjet ink is preferably 1,000 mPa·s or more.

The gelation temperature of the sol-gel phase transition type ink is preferably 40° C. or higher and 70° C. or lower, and more preferably 50° C. or higher and 65° C. or lower. The reason why the above range is preferable is as follows. In a case where the ejection temperature is near 80° C., when the gelation temperature of the ink exceeds 70° C., gelation easily occurs at the time of ejection, thus reducing ejection properties. On the other hand, when the gelation temperature is lower than 40° C., the ink after landed on a recording medium does not undergo gelation quickly. The gelation temperature is a temperature when fluidity is lowered by gelation of the ink in a sol state in a process of cooling the sol-state ink.

The viscosity at 80° C., and the viscosity and gelation temperature at 25° C. of the sol-gel phase transition type ink can be determined by measuring a temperature change in dynamic viscoelasticity of the ink using a rheometer. Specifically, a temperature change curve of the viscosity at the time when the ink is heated to 100° C. and cooled to 20° C. under conditions including a shear rate of 11.7 (1/s) and a temperature decrease rate of 0.1° C./s is obtained. Further, the viscosity at 80° C. and the viscosity at 25° C. can be obtained by reading the viscosities at 80° C. and 25° C. in the temperature change curve of the viscosity. The gelation temperature can be determined as a temperature at which the viscosity is 200 mPa·s in the temperature change curve of the viscosity.

As for the rheometer, stress control type rheometer Physica MCR series manufactured by Anton Paar, Ltd. can be used. The diameter of the corn plate can be 75 mm, and the corn angle can be 1.0°.

As for the sol-gel phase transition type ink, in order to enhance the ejection properties of the ink from the discharge recoding head, the temperature of the ink when being loaded into the discharge recoding head is preferably set between (gelation temperature+10°) C. and (gelation temperature+30°) C. of the ink. When the temperature of the ink inside the discharge recoding head is lower than (gelation temperature+10°) C., the ink undergoes gelation inside the discharge recoding head or at the surface of the nozzle, and thus the ejection properties of the ink can be easily lowered. On the other hand, when the temperature of the ink inside the discharge recoding head exceeds (gelation temperature+30°) C., the ink has an excessively high temperature, and thus the ink components may sometimes be deteriorated.

[Inkjet Recording Method]

An inkjet recording method includes the steps of 1) ejecting the above-mentioned actinic radiation-curable inkjet ink onto a recording medium, and 2) curing the ink landed on the recording medium by irradiating the ink with actinic radiation.

In the above ejection step 1), the inkjet ink stored in a discharge recoding head can be discharged toward the recording medium as droplets through nozzles. At that time, the temperature of inkjet ink stored in the discharge recoding head is set such that the wax content contained in the ink is equal to or less than the saturated solubility of the wax in that ink. That is, in the inkjet ink stored in the discharge recording head, the wax is allowed to be dissolved as much as possible.

In the above curing step 2), the ink landed on the recording medium is irradiated with light. The light to irradiate the ink can be appropriately selected depending on the type of actinic radiation-curable compounds, and ultraviolet rays or electron beams may be employed.

An inkjet recording apparatus of actinic radiation-curable inkjet type will be described. The inkjet recording apparatus of actinic radiation-curable inkjet type includes line recording type (single pass recording type) and serial recording type. Although it may be selected depending on desired resolution or recording speed of images, the line recording type (single pass recording type) is preferred from the viewpoint of high-speed recording.

Figure 1B:
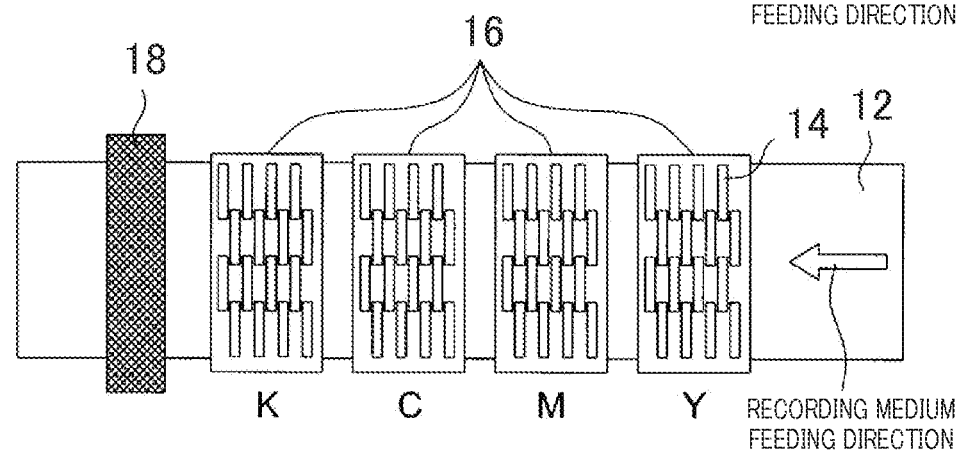
FIG. 1B is a top view illustrating the example illustrated in FIG. 1A.

FIG. 1A is a side view illustrating an example of the configuration of a main part of a line recording type inkjet recording apparatus, and FIG. 1B is a top view illustrating the example illustrated in FIG. 1A. As illustrated in FIGS. 1A and 1B, inkjet recording apparatus 10 has head carriage 16 for accommodating a plurality of ink discharge recording heads 14, actinic radiation irradiation section 18 covering the entire width of recording medium 12 and also arranged downstream of head carriage 16 (recording medium feeding direction), and temperature control section 19 installed on the lower surface of recording medium 12.

Head carriage 16 is fixedly arranged so as to cover the entire width of recording medium 12, and accommodates a plurality of ink discharge recording heads 14 that is installed for each color. Ink discharge recording head 14 is designed to receive an ink. For example, an ink may be supplied from ink cartridge 31 or the like that is attached in a freely-mountable manner to inkjet recording apparatus 10 directly or by ink supply means 30.

A plurality of ink discharge recording heads 14 is arranged for each color in the feeding direction of recording medium 12. The number of ink discharge recording heads 14 that are arranged in the feeding direction of recording medium 12 is determined based on the nozzle density of ink discharge recording head 14 and the resolution of a printed image. For example, when an image having the resolution of 1440×1440 dpi is formed by using ink discharge recording head 14 with a droplet volume of 2 pl and a nozzle density of 360 dpi, four ink discharge recording heads 14 can be arranged in a staggered manner relative to the feeding direction of recording medium 12. Further, when an image having the resolution of 720×720 dpi is formed by using ink discharge recording head 14 with a droplet volume of 6 pl and a nozzle density of 360 dpi, two ink discharge recording heads 14 can be arranged in a staggered manner. As described herein, dpi represents the number of ink drops (dots) per 2.54 cm.

Actinic radiation irradiation section 18 covers the entire width of recording medium 12, and is arranged downstream of head carriage 16 in the feeding direction of the recording medium. Actinic radiation irradiation section 18 irradiates, with actinic radiation, the droplets which have been discharged from ink discharge recording head 14 and landed on the recording medium so as to cure the droplets.

In the case where the actinic radiation is ultraviolet rays, examples of actinic radiation irradiation section 18 (ultraviolet ray irradiation means) include fluorescent tubes (low pressure mercury lamp, germicidal lamp), a cold cathode tube, an ultraviolet laser, a low pressure, medium pressure and high pressure mercury lamps having an operation pressure from several hundred Pa to 1 MPa, a metal halide lamp, and an LED. From the viewpoint of curability, ultraviolet irradiation means that irradiate ultraviolet rays at a dose of 100 mW/cm$^2$ or more; specifically, a high pressure mercury lamp, a metal halide lamp, an LED, and the like are preferred, and from the viewpoint of having less power consumption, an LED is more preferred. Specifically, a water-cooled LED with a wavelength of 395 nm manufactured by Phoseon Technology, Inc. can be used.

In the case where the actinic radiation is electron beams, examples of actinic radiation irradiation section 18 (electron beam irradiation means) include electron beam irradiation means of scanning type, curtain beam type, and broad beam type; however, from the viewpoint of the processing capacity, a curtain beam type electron beam irradiation means is preferred. Examples of the electron beam irradiation means include "CURETRON EBC-200-20-30" manufactured by Nisshin High Voltage Corp., and "Min-EB" manufactured by AIT Corp.

Temperature control section 19 is disposed on the lower surface of recording medium 12, and maintains recording medium 12 at a predetermined temperature. Temperature control section 19 may be, for example, any of the various heaters.

Hereinafter, an image recording method using line recording type inkjet recording apparatus 10 will be described. Recording medium 12 is fed between head carriage 16 and temperature control section 19 of inkjet recording apparatus 10. On the other hand, recording medium 12 is adjusted to a predetermined temperature by means of temperature control section 19. Next, an ink at high temperature is discharged from ink discharge recording head 14 of head carriage 16, and is adhered (landed) onto recording medium 12. Then, actinic radiation irradiation section 18 irradiates, with actinic radiation, the ink drops having been adhered onto recording medium 12 to cure the ink drops.

The temperature of the ink inside ink discharge recording head 14 at the time of discharging the ink from ink discharge recording head 14 is preferably set at a temperature 10 to 30° C. higher than the gelation temperature of the ink, in order to enhance the ejection properties of the ink. When the temperature of the ink inside ink discharge recording head 14 is lower than (gelation temperature+10°) C., the ink is gelled inside ink discharge recording head 14 or at the surface of the nozzle, and the ejection properties of the ink are likely to be lowered. On the other hand, when the temperature of the ink inside ink discharge recording head 14 exceeds (gelation temperature+30°) C., the ink components may sometimes be deteriorated, since the temperature of the ink is excessively high.

The droplet volume per drop that is discharged from each nozzle of ink discharge recording head 14 is preferably 1 to 10 pl, and more preferably 0.5 to 4.0 pl, in order to form an image of high resolution, although it depends on the resolution of the image.

In order to prevent the combining of neighboring ink drops, irradiation of actinic radiation is preferably performed within 10 seconds, preferably within 0.001 to 5 seconds, and more preferably within 0.01 to 2 seconds after ink drops are adhered onto the recording medium. Irradiation of actinic radiation is preferably performed after the ink is discharged from all ink discharge recording heads 14 that are accommodated in head carriage 16.

In the case where the actinic radiation is electron beams, the accelerating voltage of the electron beam irradiation is preferably 30 to 250 kV, and more preferably 30 to 100 kV, in order to achieve sufficient curing. When the accelerating voltage is 100 to 250 kV, the amount of electron beam irradiation is preferably 30 to 100 kGy, and more preferably 30 to 60 kGy.

The total ink film thickness after curing is preferably 2 to 25 μm. The "total ink film thickness" is a maximum value of the ink film thickness drawn on a recording medium.

Figure 2:
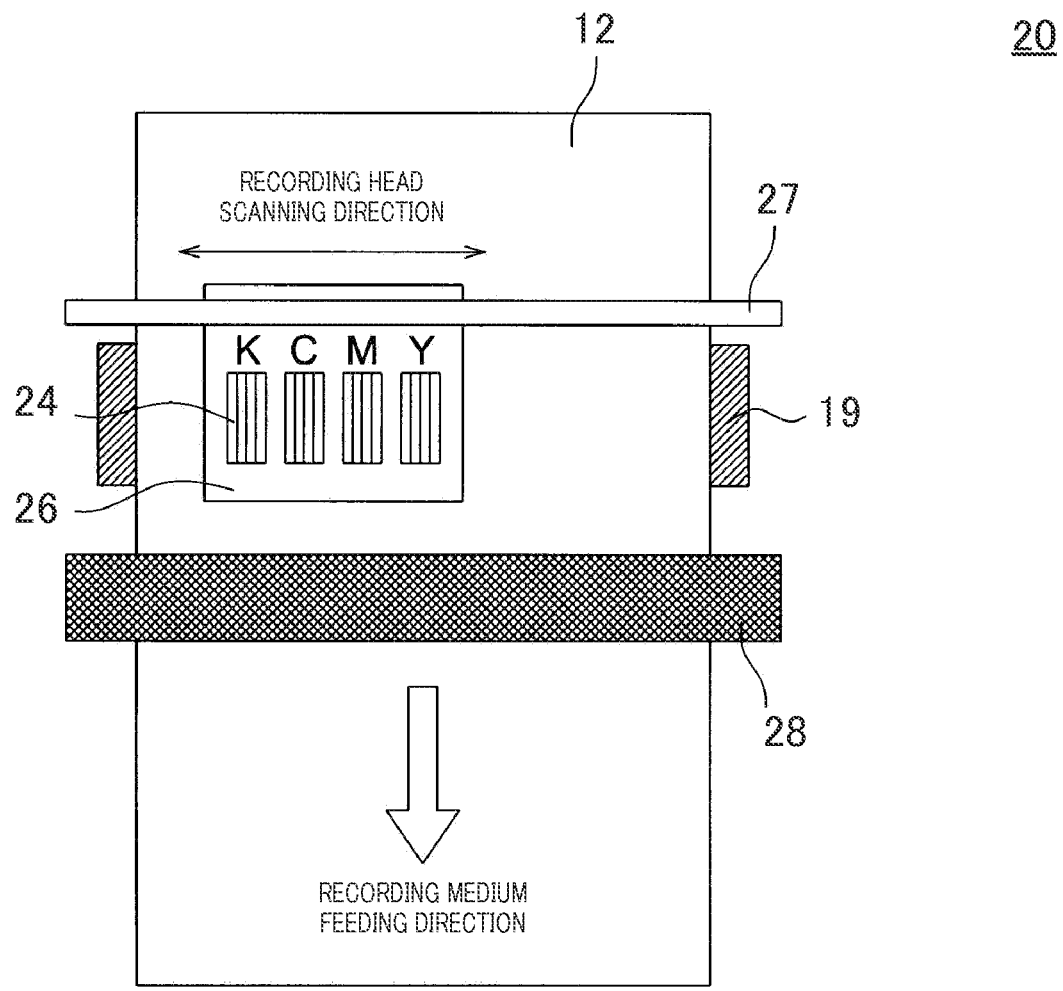
FIG. 2 illustrates an example of a configuration of a main part of a serial recording type inkjet recording apparatus.

FIG. 2 is a diagram illustrating an example of the configuration of a main part of serial recording type inkjet recording apparatus 20. As shown in FIG. 2, inkjet recording apparatus 20 may be configured in the same manner as the inkjet recording apparatus shown in FIGS. 1A and 1B, except that the apparatus includes head carriage 26 that has a width smaller than the entire width of the recording medium and accommodates therein a plurality of ink discharge recording heads 24, instead of head carriage 16 that is fixedly arranged so as to cover the entire width of the recording medium, and guide section 27 for moving head carriage 26 in the width direction of recording medium 12.

In serial recording type inkjet recording apparatus 20, while head carriage 26 is moved along guide section 27 in the width direction of recording medium 12, ink is discharged from ink discharge recording heads 24 accommodated in head carriage 26. Each time after head carriage 26 has finished moving in the width direction of recording medium 12 (for each pass), recording medium 12 is fed in the feeding direction, and irradiated with actinic radiation at actinic radiation irradiation section 28. Except for these operations, an image is recorded almost in the same manner as in the case of line recording type inkjet recording apparatus 10 described above.

EXAMPLES

Hereinafter, the present invention will be described in more detail by way of Examples; however, the scope of the present invention is not construed to be limited by these descriptions.

[Production of Actinic Radiation-Curable Inkjet Ink]

Using the following components (wax, fatty acid, photocurable compound, polymerization inhibitor, polymerization initiator, and pigment dispersion liquid), the actinic radiation-curable inkjet ink was prepared.

[Wax]

Distearyl ketone (Kao wax T1, manufactured by Kao Corporation);

Dipalmityl ketone (Hentriacontan-16-on, reagent (manufactured by AlfaAeser));

Dimyristyl ketone (14-Heptacosanone, reagent (manufactured by Tokyo Chemical Industry Co., Ltd.));

Dilauryl ketone (12-Tricosanone, reagent (manufactured by AlfaAeser));

Behenyl behenate (manufactured according to the following method);

Icosyl icosanoate (manufactured in the same manner as described in the following method);

Stearyl stearate (EXCEPARL SS, manufactured by Kao Corporation); and

Cetyl palmitate (AMREPS PC, manufactured by Kokyu Alcohol Kogyo Co., Ltd.).

[Fatty Acid]

Behenic acid (LUNAC BA, manufactured by Kao Corporation);

Arachidic acid (Eicosanic acid, reagent (manufactured by Junsei Chemical Co., Ltd.));

Stearic acid (LUNAC S-90V, manufactured by Kao Corporation); and

Palmitic acid (LUNAC P-95, manufactured by Kao Corporation).

[Photocurable Compound]

6EO-modified trimethylolpropane triacrylate (SR499, Sartomer Company, Inc.);

Polyethylene glycol #600 diacrylate (A-600, Shin Nakamura Chemical Co., Ltd.); and Tripropylene glycol diacrylate (M-220, Toa Gosei Co., Ltd.)

[Polymerization Inhibitor]

Irgastab UV10 (Ciba Specialty Chemicals Inc.)

[Polymerization Initiator]

DAROCURE TPO (Ciba Specialty Chemicals Inc.)

[Method of Synthesizing Fatty Acid Ester]

A method of synthesizing behenyl behenate from commercially available behenic acid and commercially available behenyl alcohol will be described. 6.81 g/0.020 mol of commercially available behenyl behenate, 6.86 g/0.021 mol of behenyl alcohol, 0.38 ml of concentrated sulfuric acid, and 300 ml of octadecene were mixed to give a mixture. The resultant mixture was loaded into a Dean-Stark apparatus. Thereafter, the mixture was heated and stirred at 110° C. for 1 hour to draw water generated by the reaction in the system. Next, the mixture was cooled to an arbitrary temperature, and crystals in the ester were extracted. Recrystallization was repeated further in a mixed solution of hexane and methanol to remove 1-octadecene contained in the crystal.

[Method of Reducing Amount of Fatty Acid in Fatty Acid Ester]

[Method of Reducing Amount of Fatty Acid in Wax]

A case where 5 wt % or more of a fatty acid is contained in commercially available behenyl behenate will be described. First, 12.7 g/0.02 mol of behenyl behenate (which contains 0.34 g/0.001 mol or more of behenic acid), 1.3 g/0.002 mol of behenyl alcohol, 0.38 ml of concentrated sulfuric acid, and 300 ml of octadecene were mixed to give a mixture. The resultant mixture was loaded into a Dean-Stark apparatus. Thereafter, the mixture was heated and stirred at 110° C. for 1 hour to draw water generated by the reaction in the system. Next, the mixture was cooled to an arbitrary temperature, and crystals in the mixture were extracted. Recrystallization was repeated further in a mixed solution of hexane and methanol to remove 1-octadecene contained in the crystal.

[Pigment Dispersion Liquid]

Preparation of pigment dispersion liquid 1 (M: magenta)

The dispersant, actinic radiation curable compound and polymerization inhibitor described below were introduced into a stainless steel beaker, and while the beaker was heated on a hot plate at 65° C., the content was heated and stirred for 1 hour for dissolution. The solution thus obtained was cooled to room temperature, and then magenta pigment 1 described below was added thereto in an amount of 21 parts by mass. The mixture was introduced into a glass bottle together with 200 g of zirconia beads having a diameter of 0.5 mm, the glass bottle was tightly sealed, and the mixture was subjected to a dispersion treatment for 8 hours in a paint shaker. Thereafter, the zirconia beads were removed, and thus pigment dispersion liquid 1 having the composition described below was prepared.

[Composition of Pigment Dispersion Liquid 1]

Dispersant:

AJISPER PB824 (manufactured by Ajinomoto Fine-Techno Co., Inc.) 9 parts by mass

Actinic Radiation Curable Compound:

APG-200 (Tripropylene glycol diacrylate, manufactured by Shin Nakamura Chemical Co., Ltd.) 70 parts by mass Polymerization Inhibitor:

Irgastab UV10 (manufactured by Ciba Japan K.K.) 0.02 parts by mass

Magenta Pigment 1:

Pigment Red 122 (manufactured by Dainichiseika Color & Chemicals Manufacturing Co., Ltd., Chromo Fine Red 6112JC)

[Preparation of Ink]

According to the composition shown in Table 1, a wax, a photopolymerizable compound, a polymerization inhibitor, a polymerization initiator, and pigment dispersion liquid 1 were mixed to give a mixture, which was heated to 80° C. and stirred. The solution thus obtained was filtered through a #3000 metal mesh filter under heating, and then was cooled to prepare an ink. In Table 1, the unit of the blending amount of each component is represented by parts by mass.

TABLE 1

| Component | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|---|---|---|---|---|---|---|
| Wax | Distearyl ketone | | | | | | | | | | 2 | 4 | | | | 2 | | | 3 | | |
| | Dipalmityl ketone | | 6 | | | | | | | | | | 8 | | | | | | | 1.5 | |
| | Dimyristyl ketone | | 6 | | | | | | | 3 | | | | | | | | | | | |
| | Dilauryl ketone | | | | | | | 0.2 | | | | | | | 1.5 | | 1 | | | | |
| Fatty acid | Behenyl behenate | | | 2.5 | | | | | 6 | | | 4 | | | | | | | | | 2 |
| | Icosyl icosanoate | | | | 2.5 | | | | 6 | | 1 | | | | 0.5 | 2 | | | | | |
| | Stearyl stearate | | | | | 0.5 | | | | | | | | | | | | 3 | | 0.8 | |
| | Cetyl palmitate | | | | | | | | | | | | | | | | | | 3 | | 1.5 |
| | Behenic acid | | | | | | | | | | | | | | | | | | | | | |
| | Arachidic acid | | | | | 1 | 10 ppm | | | | | | | | | | | | | | | |
| | Stearic acid | | | | | | | | | | | | | | | | | | | | | |
| | Palmitic acid | | | | | | | | | | | | | | | | | | | | | |
| Photo-curable compound | 6EO-modified trimethylolpropane triacrylate | 34.9 | 27.9 | 37.4 | 37.4 | 39.4 | 39.9 | 39.7 | 27.9 | 36.9 | 26.9 | 21.9 | 21.9 | 28.4 | 27.9 | 25.9 | 28.9 | 26.9 | 26.9 | 27.6 | 27.9 |
| | Polyethylene glycol #600 diacrylate | 25 | 20 | 20 | 20 | 20 | 20 | 20 | 20 | 20 | 20 | 20 | 20 | 20 | 20 | 20 | 20 | 20 | 20 | 20 | 20 |
| | Tripropylene glycol diacrylate | 15 | 15 | 15 | 15 | 15 | 15 | 15 | 15 | 15 | 25 | 25 | 25 | 25 | 25 | 25 | 25 | 25 | 25 | 25 | 25 |
| Polymerization inhibitor | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Polymerization initiator | | 6 | 6 | 6 | 6 | 6 | 6 | 6 | 6 | 6 | 6 | 6 | 6 | 6 | 6 | 6 | 6 | 6 | 6 | 6 | 6 |
| Pigment dispersion lipid 1 | | 19 | 19 | 19 | 19 | 19 | 19 | 19 | 19 | 19 | 19 | 19 | 19 | 19 | 19 | 19 | 19 | 19 | 19 | 19 | 19 |
| | (amount, various units) | | | | | | | | 0.5 ppm | 0.001 ppm | 0.1 ppm | 0.4 ppm | 9 ppm | 0.02 ppm | 0.05 ppm | 0.2 ppm | 5 ppm | 0.3 ppm | 1 ppm | 8 ppm | 15 ppm, 20 ppm |
| Total (parts by mass) | | 100 | 100 | 100 | 100 | 100 | 100 | 100 | 100 | 100 | 100 | 100 | 100 | 100 | 100 | 100 | 100 | 100 | 100 | 100 | 100 |
| Image formation condition | Recording medium temperature | None | 45 | 50 | 30 | None | None | None | 40 | 45 | 50 | 45 | 40 | 30 | 50 | 45 | 40 | 40 | 50 | 50 | 50 |
| | Phase transition temperature-recording medium temperature | None | 10 | 10 | 10 | None | None | None | 10 | 10 | 10 | 10 | 10 | 10 | 10 | 10 | 10 | 10 | 10 | 10 | 10 |
| Evaluation | Bleeding | A | A | A | C | A | A | A | A | A | A | A | A | A | A | A | A | A | A | A | A |
| | Surface slipperiness | C | C | C | A | C | C | C | C | C | A | A | A | A | A | A | A | A | A | A | A |
| | Ejection stability | A | C | A | A | A | A | A | C | A | A | B | B | A | A | A | A | A | A | A | A |
| | Density unevenness | C | C | A | A | C | C | C | C | A | A | A | A | A | A | A | A | A | A | A | A |

[Measurement of Amount of Fatty Acid]

The mass of the fatty acid contained in the ink was measured by HPLC under the conditions described below. Table 1 shows ratios of the measured mass of a fatty acid to the total mass of the ink.

Apparatus: HP1100 series HPLC
Column: Inertsil ODS-3 (4.6 mm id, 150 mm, 5 μm), 40° C.
Eluent A/B: 0.1 M ammonium acetate buffer solution pH 5.0/methanol
Gradient B: 90% to 100% (15 to 30 min)
Flow rate: 0.8 ml/min
Injection amount: 10 μl
Detection: ELSD

[Image Forming Method]

Monochromatic images were formed with the actinic radiation-curable inkjet inks obtained in the respective examples and comparative examples using line inkjet recording apparatus 10. The temperature of ink discharge recording head 14 of inkjet recording apparatus 10 was set at 80° C. Further, the temperature of recording medium 12 was adjusted so as to be lower than the sol-gel phase transition temperatures of the respective inks by 7 to 20° C. using temperature control section 19. Then, an outline character and a solid image having a size of 5 cm×5 cm, or color density gradation patches were printed on recording medium 12. After the images were formed, the images were irradiated with ultraviolet rays using an LED lamp (water-cooled LED at 395 nm manufactured by Phoseon Technology, Inc.) disposed on the downstream portion of the recording apparatus to cure the ink.

By discharging ink droplets from the inkjet recording head, the ink droplets are attached onto a recording medium. The temperature of the recording medium when the ink droplets are landed thereon is preferably set so as to be lower than the gelation temperature of this ink by 7 to 20° C. When the temperature of the recording medium is too low, the ink droplets undergo excessively fast gelation which leads to pinning, so that leveling of the ink droplets does not occur sufficiently, and as a result, the glossiness of an image may sometimes be lowered. On the other hand, when the temperature of the recording medium is excessively high, it is difficult for the ink droplets to undergo gelation, and therefore neighboring dots of the ink droplets may sometimes be mixed with one another. By appropriately adjusting the temperature of the recording medium, it is possible to achieve both a moderate level of leveling that does not allow for mixing among neighboring dots of the ink droplets and appropriate pinning For the ink discharge recording head, piezo heads having 512 nozzles (256 nozzles×2 rows, staggered arrays, nozzle pitch in one row: 360 dpi) with a nozzle diameter of 20 μm were used. The discharge conditions were set such that the droplet volume of one drop was 2.5 pl, and recording was performed at a resolution of 1440 dpi×1440 dpi by ejecting droplets at a droplet speed of about 6 m/s. The recording speed was set at 500 mm/s Image formation was performed under the environment of 23° C. and 55% RH. The term dpi stands for the number of dots per 2.54 cm.

[Evaluation of Image]

(Evaluation of Bleeding)

According to the above-described method, solid images having a size of 5 cm×5 cm formed on printing coated paper A (OK TOPCOAT, metric basis weight: 128 g/m², manufactured by Oji Paper Co., Ltd.), a recording medium, were stored for 1 month under the environments of 25° C. and 5° C., respectively. The images after the storage at the respective temperatures were visually observed, and bleeding was evaluated according to the following criteria:

A: No deposits are observed on the surface of an image
B: Thin deposits exist on the surface of an image, and can be observed visually
C: The surface of an image is covered with a powdery substance, and can be visually observed clearly (Evaluation of Surface Slipperiness)

According to the above-described method, a solid image having a size of 5 cm×5 cm formed on printing coated paper A (OK TOPCOAT, metric basis weight: 128 g/m², manufactured by Oji Paper Co., Ltd.), a recording medium, was rubbed by applying constant force using a finger pad with a rubber glove worn thereon, and the surface slipperiness was evaluated according to the following criteria:

A: There is no catch on a finger, with no rubbing sound, either
C: There is a catch on a finger, with a rubbing sound when rubbing the image (Evaluation of Ejection Stability)

Using an inkjet recording apparatus in which each ink prepared as describe above was loaded, the ink was ejected from the inkjet head, and the presence/absence of defective nozzles and of deflection of ejection direction were visually observed, and the ejection stability was evaluated in accordance with the following criteria:

A: No defective nozzles were observed at all
B: 1 to 4 defective nozzle(s) was/were observed, out of the total of 512 nozzles
C: 5 or more defective nozzles were observed, out of the total of 512 nozzles (Evaluation of Density Unevenness)

According to the above-described method, a solid image having a size of 5 cm×5 cm printed on printing coated paper A (OK TOPCOAT, metric basis weight: 128 g/m², manufactured by Oji Paper Co., Ltd.), a recording medium, was visually observed, and the density unevenness was evaluated according to the following evaluation criteria:

A: No density unevenness is recognized in an image, when observed at a position 15 cm distant from the image
B: Density unevenness is recognized in a part of an image, when observed at a position 15 cm distant from the image, but no density unevenness is recognized, when observed at a position 30 cm distant from the image
C: Density unevenness is recognized in an image, when observed at a position 30 cm distant from the image It can be found that the inks of Examples 1 to 11 containing a wax and a fatty acid provide satisfactory results in all the evaluation items. It can be found from the comparison between the inks of Examples 2 and 3 and the inks of Examples 1 and 4 to 11 that an ink with less wax content has enhanced ejection stability. In contrast, the ink of Comparative Example 1 containing neither wax nor fatty acid caused surface slipperiness to be deteriorated, and caused density unevenness to occur. The ink of Comparative Example 3 only containing the wax had satisfactory density unevenness, but had deteriorated surface slipperiness. The ink of Comparative Example 5 only containing the wax with an amount less than a specified amount caused not only deteriorated surface slipperiness, but also the occurrence of density unevenness. The ink of Comparative Example 2 which contained only the wax also caused not only deteriorated surface slipperiness, but also deteriorated ejection stability, with the occurrence of density unevenness. As for the inks of Comparative Examples 4 and 9 which contained a predetermined amount of the wax, but had fatty acid content outside the predetermined range, the ink of Comparative Example 4 had an excessively large amount of the fatty acid being 1 part by mass, thus causing the occurrence of bleeding, whereas the ink of Comparative Example 9 had an excessively small amount of the fatty acid, thus causing deteriorated surface slipperiness. The ink of Comparative Example 6 only containing a predetermined amount of the fatty acid caused the occurrence of density unevenness, without the occurrence of gelation, and also caused deteriorated surface slipperiness due to poor curing as a result of oxygen inhibition. The ink of Comparative Example 7 which contained a predetermined amount of the fatty acid, but had an excessively small amount of the wax had similar results to those of Comparative Example 6.

REFERENCE SIGNS LIST 10, 20 Inkjet recording apparatus
12 Recording medium
14, 24 Ink discharge recording head
16, 26 Head carriage
18, 28 Actinic radiation irradiation section
19 Temperature control section
27 Guide section

The invention claimed is:

1. An actinic radiation-curable inkjet ink, comprising:
an actinic radiation-curable compound;
at least one wax having a total mass of 1 to 8 wt % to a total mass of the ink; and
a fatty acid having a total mass of 0.0001 to 0.10 wt % to the total mass of the wax.

2. The actinic radiation-curable inkjet ink according to claim 1, wherein the total mass of the wax to the total mass of the ink is 1 to 4 wt %.

3. The actinic radiation-curable inkjet ink according to claim 1, wherein the wax is at least one of compounds represented by General Formulas (G1) and (G2):

R1-CO—R2                 General Formula (G1):

R3-COO—R4              General Formula (G2):

where R1 to R4 each independently represent an alkyl chain which has a straight chain moiety having 12 or more carbon atoms and which may have a branch.

4. The actinic radiation-curable inkjet ink according to claim 1, wherein the fatty acid is a compound having 12 or more carbon atoms.

5. An image forming method using the actinic radiation-curable inkjet ink according to claim 1, wherein
a temperature of a recording medium at a time when the actinic radiation-curable inkjet ink is landed on the recording medium is set within a range 20° C. to 7° C. lower than a sol-gel phase transition temperature of the actinic radiation-curable inkjet ink.

\* \* \* \* \*